(12) United States Patent
Navratil et al.

(10) Patent No.: US 7,275,030 B2
(45) Date of Patent: Sep. 25, 2007

(54) METHOD AND APPARATUS TO COMPENSATE FOR FUNDAMENTAL FREQUENCY CHANGES AND ARTIFACTS AND REDUCE SENSITIVITY TO PITCH INFORMATION IN A FRAME-BASED SPEECH PROCESSING SYSTEM

(75) Inventors: Jiri Navratil, White Plains, NY (US); Ganesh N. Ramaswamy, Ossining, NY (US); Ran D. Zilca, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 622 days.

(21) Appl. No.: 10/601,365

(22) Filed: Jun. 23, 2003

(65) Prior Publication Data
US 2004/0260552 A1    Dec. 23, 2004

(51) Int. Cl.
*G10L 11/04* (2006.01)
(52) U.S. Cl. .................................. 704/207
(58) Field of Classification Search ............. 704/207
See application file for complete search history.

(56) References Cited

U.S. PATENT DOCUMENTS

| | | | | |
|---|---|---|---|---|
| 4,941,178 A | * | 7/1990 | Chuang | 704/252 |
| 5,651,090 A | * | 7/1997 | Moriya et al. | 704/200.1 |
| 5,787,398 A | * | 7/1998 | Lowry | 704/268 |
| 5,839,098 A | * | 11/1998 | Laroia et al. | 704/203 |
| 6,125,344 A | * | 9/2000 | Kang et al. | 704/207 |

OTHER PUBLICATIONS

J.D. Markel et al., Linear Prediction Speech 1976, Springer-Verlag Berlin Heidelberg New York 1976, p. 10.*
Barnwell III et al., Speech Coding 1996, Jon Wiley & Sons, Inc., pp. 90-91.*
Quatieri et al., Shape Invariant Time-Scale and Pitch Modification of Speech Mar. 1992, IEEE, pp. 497-510.*
Ansari et al., Pitch Modification of Speech Using a Low-Sensitivity Inverse Filter Approach Mar. 1998, IEEE, pp. 60-62.*
Spanias, "Speech Coding: A Tutorial Review", Proceedings of the IEEE, vol. 82, No. 10, Oct. 1994, pp. 1539-1582.
Chu et al., "Iterative Deepening Dynamic Time Warping for Time Series", 2nd SIAM Int. Conf. On Data Mining (SDM-02), 2002, pp. 1-18.

* cited by examiner

*Primary Examiner*—David Hudspeth
*Assistant Examiner*—Jakieda R. Jackson
(74) *Attorney, Agent, or Firm*—Duke W. Yee; Anne V. Dougherty; Gerald H. Glanzman

(57) ABSTRACT

A method, computer program product, and data processing system for compensating for fundamental frequency changes in a frame-based speech processing system is disclosed. In a preferred embodiment of the present invention, a frame of a voiced speech signal is processed by an inverse linear-predictive filter to obtain a residual signal that is indicative of the fundamental tone emitted by the speaker's vocal cords. A transformation function is applied to the frame to limit the frame to an integer number of pitch cycles. This transformed frame is used in conjunction with vocal tract parameters obtained from the original speech signal frame to construct a pitch-adjusted speech signal that can more easily be understood by speech- or speaker recognition software.

30 Claims, 3 Drawing Sheets

METHOD AND APPARATUS TO COMPENSATE FOR FUNDAMENTAL FREQUENCY CHANGES AND ARTIFACTS AND REDUCE SENSITIVITY TO PITCH INFORMATION IN A FRAME-BASED SPEECH PROCESSING SYSTEM

BACKGROUND OF THE INVENTION

1. Technical Field

A preferred embodiment of the present invention generally relates to speech processing methods and systems (i.e., systems that accept human voice as input). More specifically, the invention is directed to speech processing to be performed in the context of speech or speaker recognition.

2. Description of Related Art

Almost every speech processing system uses some form of frame-based processing, in which speech signals are divided according to intervals of time called frames. This includes speech recognition systems (which are used to identify spoken words in an audio signal), speaker recognition systems (which are used to ascertain the identity of a speaker), and other systems that use speech as input, such as speech-to-speech translators, stress detectors, etc. All of the above systems typically employ digitally-sampled signal speech signals divided into frames having a fixed frame size. By fixed frame size, it is meant that each frame contains a fixed number of digital samples of the input speech (obtained from an audio signal via an analog-to-digital converter, for example).

Dividing speech into frames allows the speech signal to be analyzed frame-by-frame in order to match a particular frame with the phoneme or portion of a phoneme contained within the frame. Although such a frame-by-frame analysis does reduce the otherwise overwhelming computational complexity of the analysis, in some ways the frame-based approach oversimplifies the analysis, at least with respect to real human speakers.

Voiced speech is speech in which the vocal cords vibrate. One of ordinary skill in the art will recognize that some speech sounds constitute voiced speech (like the sound of the letter "v" in English or any vowel sound), while others (such as the letter "s" in English) are unvoiced (i.e., are emitted without vocal cord vibration). The human voice, just like a musical instrument, emits tones by generating periodic vibrations that have a fundamental frequency or pitch. In voiced human speech, this frequency varies according to the speaker, context, emotion, and other factors. In these periodic tones, a single period of vocal cord vibration is called a "pitch cycle."

Current speech- and speaker recognition systems generally do not take into account the actual current fundamental frequency of the speaker. It would be advantageous if there were a technique that would allow speech recognition systems to account for variations in the speaker's pitch without requiring a burdensome amount of computational overhead.

SUMMARY OF THE INVENTION

A preferred embodiment of the present invention provides a method, computer program product, and data processing system for compensating for fundamental frequency changes in a frame-based speech processing system. Current speech- and speaker recognition systems generally do not take into account the actual current fundamental frequency of the speaker. This causes a number of undesired phenomena, some of which are discussed below.

First, not every frame contains an integer number of speech cycles, and therefore, in general, a partial cycle will be present in each frame. This introduces spectral artifacts into the speech signal that affect the analysis following the division of the speech signal into frames. This degrades the functionality of the speech processing system.

Second, for higher-pitched speakers, every speech frame typically includes more than one pitch cycle, resulting in fine structure modifications/fluctuations of the speech signal's frequency spectrum. These fluctuations are less prevalent in lower-pitched speakers. These fluctuations introduce undesired performance-degrading variability in systems that use spectral analysis to characterize the speech signal (such as speech recognition and speaker recognition systems.

For example, a speech recognition system that is trained to recognize a particular word will recognize that word with less accuracy, even when uttered exactly the same as during training, as long as the fundamental frequency is different. As another example, a speaker recognition system is more prone to falsely reject a genuine user if the user's frequency values are significantly different that those produced by the user in enrolling the user's speaker model (a user "enrolls" a speaker model before the first use of a speaker recognition system, and that speaker model is then subsequently used as a reference to identify the speaker). A speaker recognition system is also more prone to falsely accept an imposter if the imposter's pitch values are close to the pitch values that the genuine user produced while enrolling. Thus, the accuracy of speaker-recognition systems is highly sensitive to a speaker's pitch, although a given speaker's pitch can be mimicked and modified easily by humans.

Current methods typically do not address the aforementioned problems directly, or alternatively address the problem using a variable frame size that is adapted to the speech pitch frequency. Using a variable frame size imposes a substantial management burden on the implementation of such systems. Therefore, only a very small number of today's systems use variable frame sizes, and the vast majority of systems use fixed-size frames, where the choice of frame size is a compromise that attempts to match average pitch frequency values.

In a preferred embodiment of the present invention, a frame of a voiced speech signal is processed by an inverse linear-predictive filter to obtain a residual signal that is indicative of the fundamental tone emitted by the speaker's vocal cords. A transformation function is applied to the frame to limit the frame to an integer number of pitch cycles. This transformed frame is used in conjunction with vocal tract parameters obtained from the original speech signal frame to construct a pitch-adjusted (essentially monotone) speech signal that can more easily be understood by speech- or speaker-recognition software.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
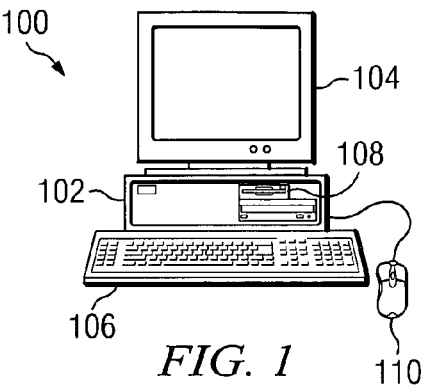
FIG. 1 is a diagram of an example of a computer system in which a preferred embodiment of the present invention may be implemented.

With reference now to the figures and in particular with reference to FIG. 1, a pictorial representation of a data processing system in which a preferred embodiment of the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
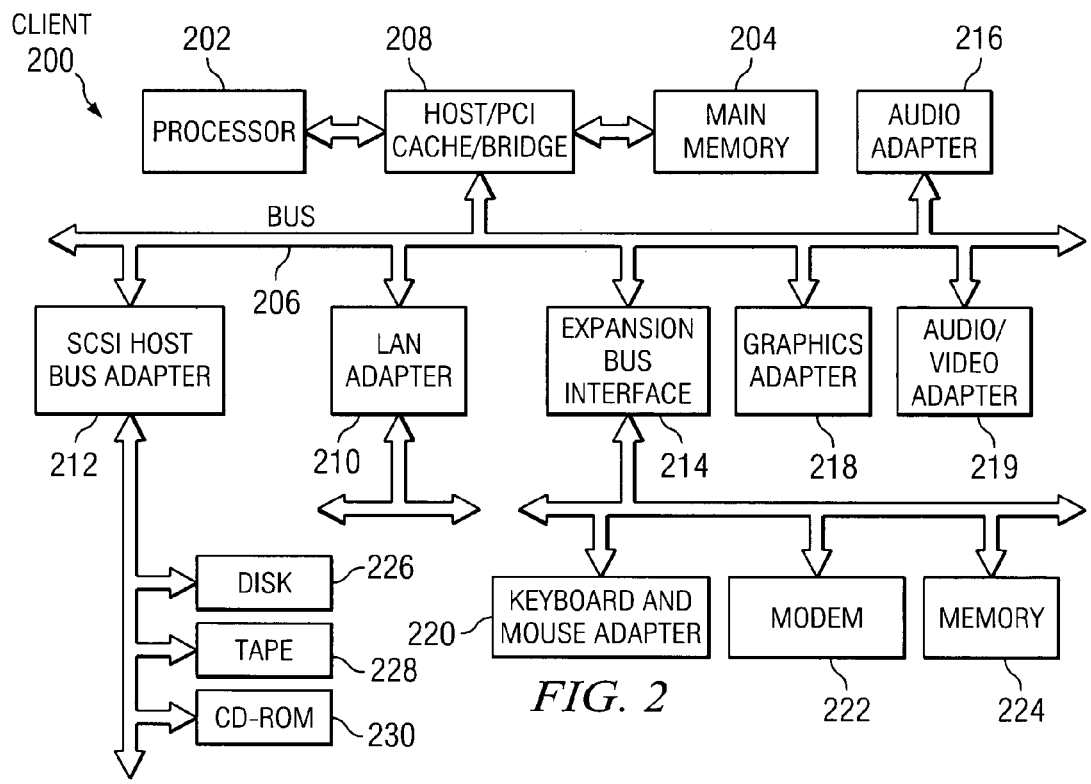
FIG. 2 is a block diagram of an example of a computer system in which a preferred embodiment of the present invention may be implemented.

With reference now to FIG. 2, a block diagram of a data processing system is shown in which a preferred embodiment of the present invention may be implemented. Data processing system 200 is an example of a computer, such as computer 100 in FIG. 1, in which code or instructions implementing the processes of a preferred embodiment of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of a preferred embodiment of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of a preferred embodiment of the present invention are performed by processor 202 using computer implemented instructions, which may be located in a memory such as, for example, main memory 204, memory 224, or in one or more peripheral devices 226-230.

A preferred embodiment of the present invention provides a method, computer program product, and data processing system for compensating for fundamental frequency changes in a frame-based speech processing system. In a preferred embodiment of the present invention, a frame of a voiced speech signal is processed by an inverse linear-predictive filter to obtain a residual signal that is indicative of the fundamental tone emitted by the speaker's vocal cords. A transformation function is applied to the frame to limit the frame to an integer number of pitch cycles. This transformed frame is used in conjunction with vocal tract parameters obtained from the original speech signal frame to construct a pitch-adjusted speech signal that can more easily be understood by speech- or speaker-recognition software.

A preferred embodiment of the present invention makes use of linear-predictive coding (LPC) to obtain vocal tract parameters and a residual signal from an input voice signal. One of ordinary skill in the art will recognize, however, that any speech coding scheme that can be employed to divide a speech signal into vocal tract model parameters and a residual signal may be employed without departing from the scope and spirit of the present invention.

Figure 3:
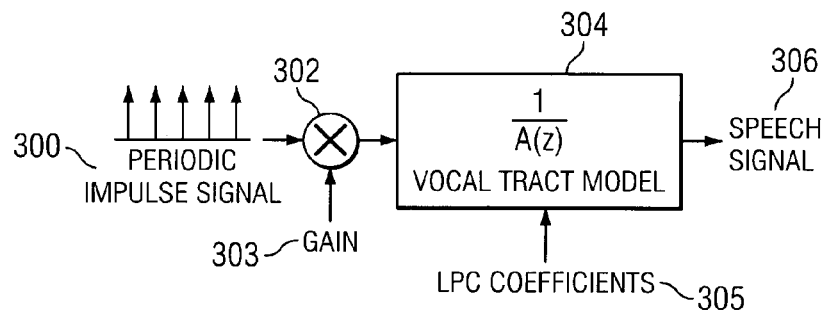
FIG. 3 is a block diagram illustrating the signal processing model employed in linear-predictive speech analysis and synthesis.

FIG. 3 is a block diagram that illustrates the principles behind the LPC speech-coding scheme. FIG. 3 is actually a block diagram of a speech synthesizer that uses the LPC method to produce voiced speech, but one of ordinary skill in the art will recognize that analysis of speech using an LPC-based scheme is the reverse of synthesis. It is hoped that by examining LPC-based synthesis, the reader will find LPC-based speech analysis to be easier to understand.

A periodic impulse signal 300 models the behavior of vocal cords vibrating at a particular fundamental frequency. Multiplier 302 multiplies periodic impulse signal 300 by a gain factor 303 to amplify periodic impulse signal 300 to an audible level. This result is passed through a filter 304 to obtain a resulting speech signal 306.

Filter 304 is designed according to a z-domain transfer function that is the reciprocal of a polynomial A(z). One of ordinary skill in the art will recognize that the z-domain, which is the co-domain of the z-transform, is the discrete counterpart to the s-domain, which is the co-domain of the Laplace transform. According to generally accepted notation, the indeterminate of a polynomial in the z-domain is always written as "z." Hence A(z) is of the form $c_{n1}z^{n1}+ \ldots +c_0z^0$, where the $C_{n-i}$ term are constants. A more comprehensive description of the z-transform may be found in virtually every introductory digital signal processing textbook, so further description of the z-transform is not provided here.

Filter 304 models the resonances of the vocal tract of a human speaker. The coefficients of A(z) (LPC coefficients 305) are thus provided as input to filter 304 in order to create different voiced sounds. For example, the letter "a" as used in the English word "father," would require a different set of coefficients than would the letter "e" as used in the English word "me."

FIG. 3 thus illustrates that voiced speech, whether human or synthesized, is composed of two components, a periodic signal and a set of vocal tract parameters (e.g., LPC coefficients 305 in FIG. 3) for modifying the periodic signal to achieve vowel and voiced consonant sounds. Although FIG. 3 depicts LPC-based speech synthesis, LPC analysis and filtering to obtain a periodic signal and a set of LPC coefficients from a speech signal are also widely known in the field of speech processing, and "black box" hardware and software system components for performing LPC synthesis, analysis, and filtering are commercially available from a number of vendors. Further description of LPC as applied to the general subject of speech coding may be found in Andreas S. Spanias, "Speech Coding: A Tutorial Review," *Proceedings of the IEEE*, vol. 82, no. 10, October 1994, which is incorporated herein by reference. One of ordinary skill will also recognize that LPC technology is used in mobile telephones as a form of speech compression.

Figure 4:
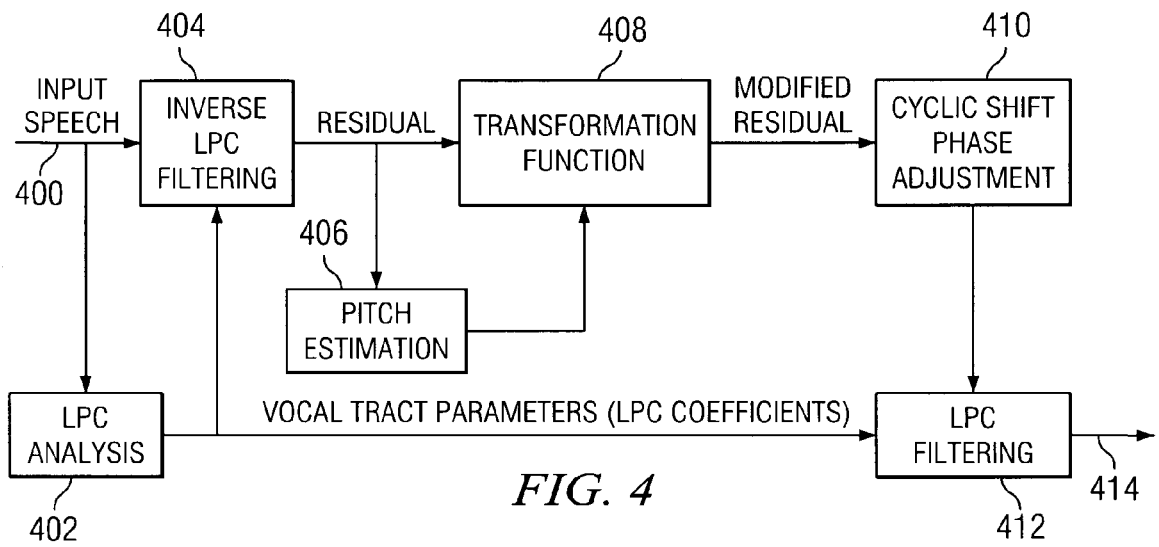
FIG. 4 is a block diagram illustrating an overall operational flow of a preferred embodiment of the present invention.

FIG. 4 is a block diagram providing an overall operational flow of a preferred embodiment of the present invention. A frame of input speech (input speech frame 400) is provided as input. LPC analysis block 402 analyzes input speech frame 400 to determine a set of LPC coefficients (i.e., vocal tract parameters) for input speech frame 400. Meanwhile, an inverse LPC filter 404 obtains a frame containing a periodic signal, called the "residual" signal, from input speech frame 400 by using the coefficients determined by LPC analysis block 402 to remove the vocal tract-related information from input speech frame 400. Inverse LPC filter 404 is called "inverse," because it performs the inverse of the filtering operation performed by filter 304 in the LPC synthesizer of FIG. 3.

Figure 5:
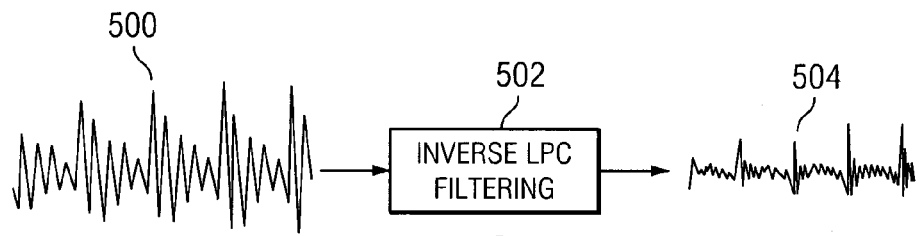
FIG. 5 is a diagram illustrating the relationship between a speech signal and a residual signal in a preferred embodiment of the present invention.

Inverse LPC filtering accentuates the period component of input speech frame 400, so that the fundamental frequency or pitch of the speech can be more easily ascertained. This is clearly shown in FIG. 5. In FIG. 5, raw speech signal 500 (shown here in the form of a time-domain plot) is processed by inverse LPC filtering stage 502 to obtain a more clearly periodic residual signal 504, which more clearly resembles the ideal periodic impulse signal (signal 300) of FIG. 3. As can be seen from the example in FIG. 5, the pitch cycles in residual signal 504 are clearly discernable by virtue of the fact that each pitch cycle contains a single peak value that can be easily identified.

Returning now to FIG. 4, the residual signal is processed by a pitch estimation stage 406, which determines where the pitch cycles are by detecting peaks in the residual signal. This pitch cycle location information is passed along to transformation function 408, along with the residual signal itself. Transformation function 408 transforms or adjusts the residual signal frame so that an integer number of pitch cycles are present within the frame (i.e., no partial cycles are present in the frame). In one particular embodiment, this integer number is pre-determined to be one, but it is contemplated that any integer number of pitch cycles may be utilized instead. Transformation function 408 produces as output a frame of the same size as input speech frame 400, but in which the number of pitch cycles are present within the frame.

Figure 6A:
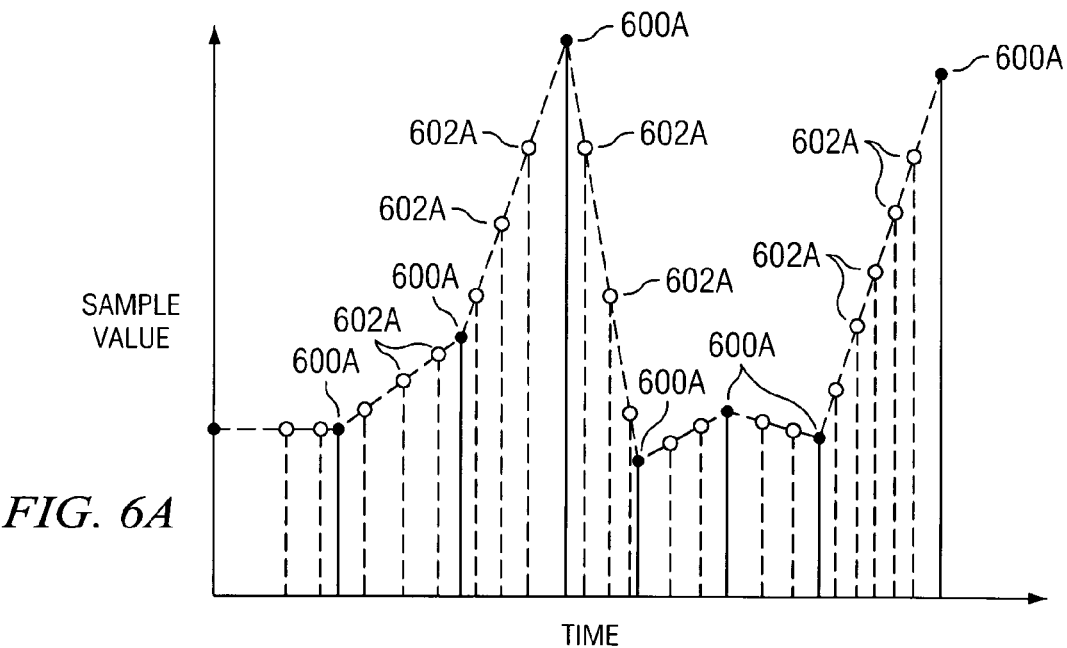
FIGS. 6A-6C are diagrams illustrating three transformation functions that may be applied to generate a modified residual signal frame in accordance with a preferred embodiment of the present invention.
Figure 6B:
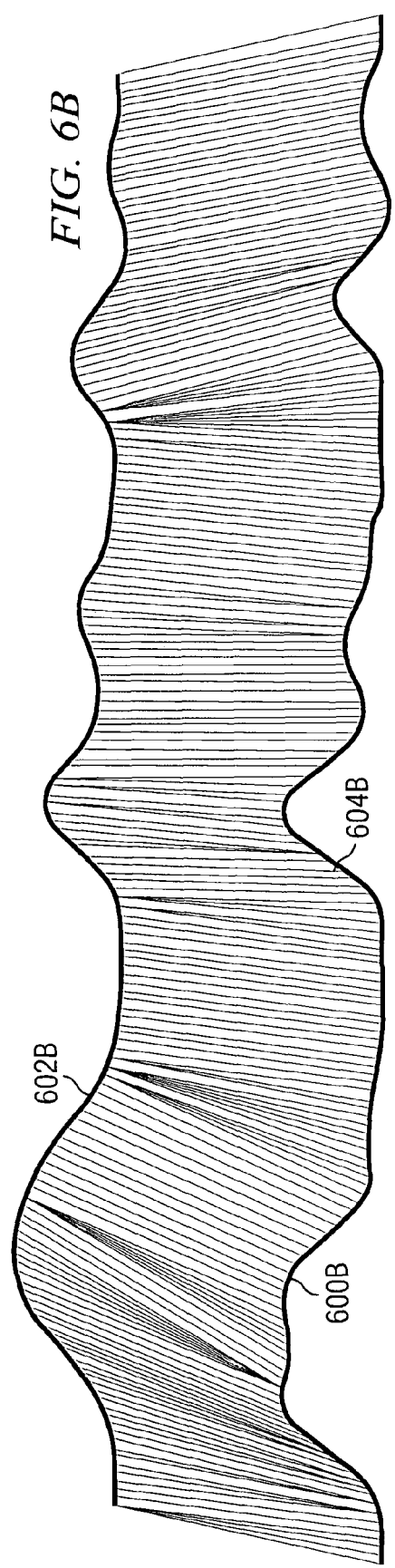
Figure 6C:
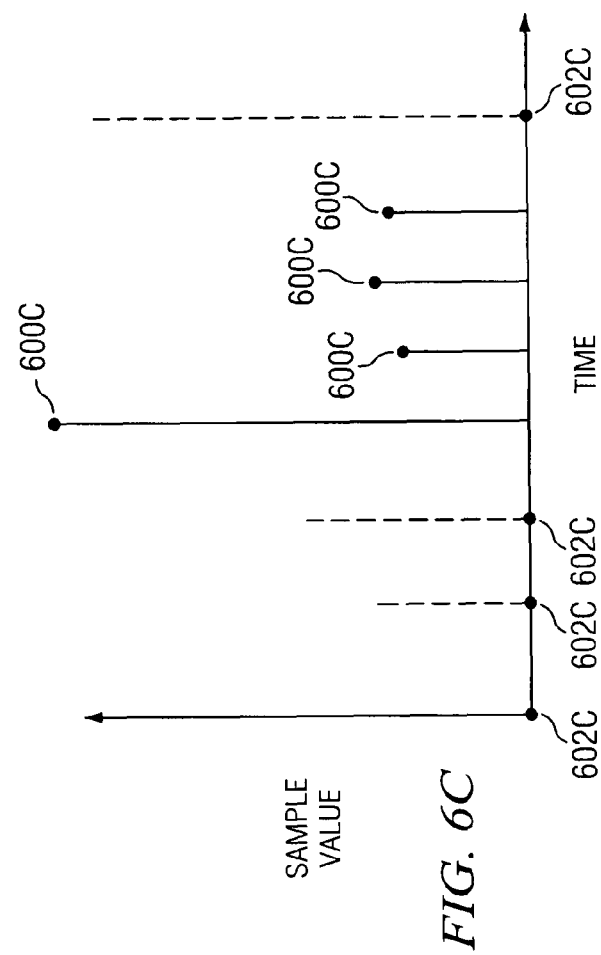

A large number of transformation functions may be utilized in a preferred embodiment of the present invention, and a sampling of possible transformation functions are included here and described graphically with reference to FIGS. 6A-6C. FIG. 6A depicts a transformation function that uses multi-rate signal processing to perform time-scaling of a portion of a signal containing an integer number of pitch cycles. Samples 600A represent the samples from that portion of the residual signal frame. As FIG. 6A depicts, a new set of samples 602A is obtained by performing linear interpolation between consecutive samples from samples 600A and generating N samples from the piecewise-linear function that results from the interpolation, where N is the number of samples in the fixed-size frames being employed. The result of this transformation function is to "stretch" the time scale of the residual signal so as to obtain a normalized frequency.

Another possible transformation function that can be utilized in a preferred embodiment of the present invention utilizes non-linear time warping (also known as dynamic time warping). Dynamic/non-linear time warping is well-known in the area of speech processing as a means of matching samples in a time-domain speech signal with a reference signal for speech recognition purposes. In the context of a preferred embodiment of the present invention, however, the technique is used to change the time scale of the residual signal.

Since it is known that the residual signal will more or less track a periodic impulse function, a reference function that also tracks a periodic impulse function, but at some normalized frequency, can be matched with the residual signal by finding a pairing relation that minimizes some form of distance metric between the sample values in the residual signal and the sample values in the reference signal. For example, in FIG. 6B, signal 600B is being matched with signal 602B using dynamic time warping. Line segments 604B connect samples in signal 600B with corresponding samples in signal 602B according the which pairing minimize a distance function (such as Euclidean distance) between the sample coordinates of time and sample value.

In the context of a preferred embodiment of the present invention, if the number of matches made between the residual signal and the reference signal is pre-specified to be equal to the number of samples in the fixed frame size and if the number of samples in the reference signal is also equal to the number of samples in the fixed frame size, then for each consecutive sampling period in the fixed frame size, a corresponding sample from the residual signal may be associated with that sampling period. Thus, a fixed-size frame of size N may be filled with sample values taken from an M-cycle portion of a residual signal frame (M<N) by mapping each sample in an N-cycle reference signal with a corresponding sample in the M-cycle portion. This results in a non-linear form of time-scale stretching in which some samples are repeated.

The actual matching process can be performed using any one of a number of non-linear time warping algorithms. The "classic" dynamic time warping algorithm is reviewed in Selina Chu, Eamonn Keogh, David Hart, and Michael Pazzani, "*Iterative Deepening Dynamic Time Warping for Time Series*," in Proceedings of 2nd SIAM International Conference on Data Mining (SDM-02), Arlington, Va., Apr. 11-13, 2002, which is incorporated herein by reference. For the interested reader, dynamic time warping was originally described in H. Sakoe & S. Chiba, Dynamic programming algorithm optimization for spoken word recognition," *IEEE Trans. Acoustics, Speech, and Signal Processing*, Vol. 26, pp. 143-165.

FIG. 6C demonstrates yet another transformation function that may be applied in the context of a preferred embodiment of the present invention. This transformation function maps all samples that are not within the selected pitch cycle(s) to zero, while mapping the samples within the selected pitch cycle(s) to their identical values. This transformation function does not stretch the time scale, as in the previous two transformation function, but instead simply limits the number of pitch cycles in the frame to an integer number by eliminating samples over and above the samples necessary to contain the selected integer number of pitch cycles. In FIG. 6C, samples 600C form a single pitch cycle and are mapped by the transformation function to their identical values. Samples 602C, in constrast, are mapped from their original values to zero by the transformation function.

Returning now to FIG. 4, the modified residual signal frame that is the result of transformation function 408 is optionally fed into a cyclic shift phase adjustment stage 410, which performs a cyclic shift of the modified residual signal frame with respect to time. Cyclic shifting rotates the sample values forward or backward in time (i.e., to the left or right). For example, if there are 5,000 samples in a frame numbered consecutively ($S_1$, $S_2$, $S_3$, . . . , $S_{4999}$, $S_{5000}$), cyclic shifting the frame one sample period to the right would cause the samples to be rearranged as $S_{5000}$, $S_1$, $S_2$, $S_3$, . . . , $S_{4999}$. Cyclic shifting, thus, changes the phase of the modified residual signal, but does not change the sample values themselves. Cyclic shifting can be used in a preferred embodiment of the present invention to normalize the phase of the resulting frames so that each frame begins and ends with a minimum sample value.

Finally, the vocal tract parameter (LPC coefficients) from LPC analysis 402 are combined with the resulting cyclically-shifted modified residual signal frame at LPC filtering stage 412, which is similar to filter 304 in FIG. 3. This resulting in speech output 414, which is phonetically equivalent to input speech 400 (through the preservation of vocal tract parameters), but modified in pitch so as to be normalized for use by subsequent speech- or speaker-recognition stages.

It is important to note that while a preferred embodiment of the present invention has been described in the context of a fully functioning data processing system, those of ordinary skill in the art will appreciate that the processes of embodiments of the present invention are capable of being distributed in the form of a computer readable medium of instructions or other functional descriptive material and in a variety of other forms and that the teachings of the present invention are equally applicable regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system. Functional descriptive material is information that imparts functionality to a machine. Functional descriptive material includes, but is not limited to, computer programs, instructions, rules, facts, definitions of computable functions, objects, and data structures.

The description of a preferred embodiment of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method comprising:

filtering a frame of a first speech signal to obtain a residual signal frame and a set of vocal tract model parameters, wherein the frame of the first speech signal and the residual signal frame contain a same fixed number of samples;

determining from the residual signal frame at least one pitch cycle within the residual frame;

applying a transformation function to the residual frame to obtain a modified residual frame, wherein the modified residual frame contains an integer number of pitch cycles; and synthesizing a second speech signal from the modified residual frame and the set of vocal tract model parameters, whereby the second speech signal is a pitch-compensated speech signal.

2. The method of claim 1, wherein the integer number of pitch cycles is a predetermined integer number of pith cycles.

3. The method of claim 2, wherein the integer number of pitch cycles is predetermined to be one.

4. The method of claim 1, wherein the transformation function changes a time scale of a residual signal represented by the residual signal frame.

5. The method of claim 4, wherein the transformation function changes the time scale of the residual signal by performing operations that include:
   selecting a set of samples from the residual signal, wherein the set of samples is a consecutive sequence of samples taken from the residual signal, such that the set of samples corresponds to a contiguous interval of time in the residual signal;
   performing linear interpolation between samples in the first set of samples so as to model the residual signal over said contiguous interval of time as a piecewise linear function; and
   generating the modified residual signal by generating a new sequence of samples from the piecewise linear function such that the cardinality of the new sequence of samples is equal to the same fixed number of samples as contained in the residual signal frame.

6. The method of claim 4, wherein the transformation function changes the time scale of the residual signal by performing a non-linear time warping operation on an interval of the residual signal so as to find a correspondence between samples from the interval of the residual signal and samples in a reference signal.

7. The method of claim 6, wherein the non-linear time warping operation is performed according to a dynamic time warping algorithm.

8. The method of claim 1, wherein the transformation function generates a modified residual signal frame from the residual signal frame by performing operations that include:
   mapping to zero a first subset of samples from a residual signal represented by the residual signal frame; and
   mapping a second subset of samples from the residual signal to their identical values.

9. The method of claim 1, further comprising:
   cyclically shifting samples in the modified residual signal frame so as to normalize a phase of the modified residual signal frame.

10. The method of claim 1, further comprising:
    feeding the modified residual signal frame to at least one of speech recognition software and speaker recognition software.

11. A computer program product in a computer-readable medium comprising functional descriptive material that, when executed by a computer, causes the computer to perform acts that include:
    filtering a frame of a first speech signal to obtain a residual signal frame and a set of vocal tract model parameters, wherein the flame of the first speech signal and the residual signal frame contain a same fixed number of samples;
    determining from the residual signal frame at least one pitch cycle within the residual frame;
    applying a transformation function to the residual frame to obtain a modified residual frame, wherein the modified residual frame contains an integer number of pitch cycles; and
    synthesizing a second speech signal from the modified residual frame and the set of vocal tract model parameters, whereby the second speech signal is a pitch-compensated speech signal.

12. The computer program product of claim 11, wherein the integer number of pitch cycles is a predetermined integer number of pitch cycles.

13. The computer program product of claim 12, wherein the integer number of pitch cycles is predetermined to be one.

14. The computer program product of claim 11, wherein the transformation function changes a time scale of a residual signal represented by the residual signal frame.

15. The computer program product of claim 14, wherein the transformation function changes the time scale of the residual signal by performing operations that include:
    selecting a set of samples from the residual signal, wherein the set of samples is a consecutive sequence of samples taken from the residual signal, such that the set of samples corresponds to a contiguous interval of time in the residual signal;
    performing linear interpolation between samples in the first set of samples so as to model the residual signal over said contiguous interval of time as a piecewise linear function; and
    generating the modified residual signal by generating a new sequence of samples from the piecewise linear function such that the cardinality of the new sequence of samples is equal to the same fixed number of samples as contained in the residual signal frame.

16. The computer program product of claim 14, wherein the transformation function changes the time scale of the residual signal by performing a non-linear time warping operation on an interval of the residual signal so as to find a correspondence between samples from the interval of the residual signal and samples in a reference signal.

17. The computer program product of claim 16, wherein the non-linear time warping operation is performed according to a dynamic time warping algorithm.

18. The computer program product of claim 11, wherein the transformation function generates a modified residual signal frame from the residual signal frame by performing operations that include:
    mapping to zero a first subset of samples from a residual signal represented by the residual signal frame; and
    mapping a second subset of samples from the residual signal to their identical values.

19. The computer program product of claim 11, comprising additional functional descriptive material that, when executed by the computer, causes the computer to perform additional acts that include:
    cyclically shifting samples in the modified residual signal frame so as to normalize a phase of the modified residual signal frame.

20. The computer program product of claim 11, comprising additional functional descriptive material that, when executed by the computer, causes the computer to perform additional acts that include:
    feeding the modified residual signal frame to at least one of speech recognition software and speaker recognition software.

21. A data processing system comprising:
    means for filtering a frame of a first speech signal to obtain a residual signal frame and a set of vocal tract model parameters, wherein the frame of the first speech signal and the residual signal frame contain a same fixed number of samples;
    means for determining from the residual signal frame at least one pitch cycle within the residual frame;
    means for applying a transformation function to the residual frame to obtain a modified residual frame, wherein the modified residual frame contains an integer number of pitch cycles; and means for synthesizing a second speech signal from the modified residual frame and the set of vocal tract model parameters, whereby the second speech signal is a pitch-compensated speech signal.

22. The data processing system of claim 21, wherein the integer number of pitch cycles is a predetermined integer number of pitch cycles.

23. The data processing system of claim 22, wherein the integer number of pitch cycles is predetermined to be one.

24. The data processing system of claim 21, wherein the transformation function changes a time scale of a residual signal represented by the residual signal frame.

25. The data processing system of claim 24, wherein the transformation function changes the time scale of the residual signal by performing operations that include:

selecting a set of samples from the residual signal, wherein the set of samples is a consecutive sequence of samples taken from the residual signal, such that the set of samples corresponds to a contiguous interval of time in the residual signal;

performing linear interpolation between samples in the first set of samples so as to model the residual signal over said contiguous interval of time as a piecewise linear function; and generating the modified residual signal by generating a new sequence of samples from the piecewise linear function such that the cardinality of the new sequence of samples is equal to the same fixed number of samples as contained in the residual signal frame.

26. The data processing system of claim 24, wherein the transformation function changes the time scale of the residual signal by performing a non-linear time warping operation on an interval of the residual signal so as to find a correspondence between samples from the interval of the residual signal and samples in a reference signal.

27. The data processing system of claim 26, wherein the non-linear time warping operation is performed according to a dynamic time warping algorithm.

28. The data processing system of claim 21, wherein the transformation function generates a modified residual signal frame from the residual signal frame by performing operations that include:

mapping to zero a first subset of samples from a residual signal represented by the residual signal frame; and mapping a second subset of samples from the residual signal to their identical values.

29. The data processing system of claim 21, further comprising:

means for cyclically shifting samples in the modified residual signal frame so as to normalize a phase of the modified residual signal frame.

30. The data processing system of claim 21, further comprising:

means for feeding the modified residual signal frame to at least one of speech recognition software and speaker recognition software.

* * * * *